United States Patent
Kumano

(10) Patent No.: US 9,587,621 B2
(45) Date of Patent: Mar. 7, 2017

(54) WATER WHEEL IMPELLER BLADE TYPE ELECTRIC POWER GENERATING APPARATUS

(71) Applicant: Japan System Planning Co., Ltd., Tokyo (JP)

(72) Inventor: Katsuyuki Kumano, Tokyo (JP)

(73) Assignee: JAPAN SYSTEM PLANNING CO., LTD., Tokyo (JP)

( * ) Notice: Subject to any disclaimer, the term of this patent is extended or adjusted under 35 U.S.C. 154(b) by 0 days.

(21) Appl. No.: 14/641,751

(22) Filed: Mar. 9, 2015

(65) Prior Publication Data

US 2015/0267675 A1     Sep. 24, 2015

(30) Foreign Application Priority Data

Mar. 24, 2014 (JP) ................ 2014-060691

(51) Int. Cl.
*F03B 17/06* (2006.01)

(52) U.S. Cl.
CPC ........ *F03B 17/065* (2013.01); *F05B 2240/12* (2013.01); *F05B 2260/4021* (2013.01);
(Continued)

(58) Field of Classification Search
CPC ....................................................... F03B 7/00
(Continued)

(56) References Cited

U.S. PATENT DOCUMENTS

| 376,357 A | * | 1/1888 | Weeks | ............ F03D 3/002 |
| | | | | 415/140 |
| 4,296,602 A | * | 10/1981 | Hales | ............ F03B 17/063 |
| | | | | 415/124.1 |

(Continued)

FOREIGN PATENT DOCUMENTS

| GB | 2190144 A | * | 11/1987 | ............ F03B 17/065 |
| GB | 2480129 A | | 9/2011 | |

(Continued)

OTHER PUBLICATIONS

Translation of Claims and Detailed Description for JP4659917B.
Search Report, Intellectual Property Office in South Wales, Date of search:Aug. 5, 2015, Application No. GB1504032.2.

*Primary Examiner* — Joseph Waks
(74) *Attorney, Agent, or Firm* — Lynette Wylle; Apex Jurls, pllc

(57) ABSTRACT

A water wheel impeller blade type electric power generating apparatus including a floating body, which buoys an attached electric power generating apparatus body while floating under water and allowing inflow and outflow of a water stream, an anchorage unit anchoring the electric power generating apparatus body at a fixed position in the water stream, a rotor pivotally supported within the electric power generating apparatus body enabling rotation, the rotor orthogonally disposed to the water stream, an impeller blade group including a plurality of impeller blades attached on an outer periphery of the rotor for automatically opening at a lower side of the rotor and closing at an upper side of the rotor, the impeller blade group receiving force by the water stream flowing in the electric power generating apparatus body with open impeller blades to rotate the rotor, an inclined plate for guiding the water stream, having one end attached at an upper end of the electric power generating apparatus body at a water inflow side with a projecting tip approaching a vicinity of an impeller blade attached to the rotor, and a power generator generating electric power by transmission of rotating force generated by rotation of the rotor, and an inclined plate set between 20° and 45° having a projecting tip set within a range of ±30% of a diameter of the rotor above or below a position corresponding to a shaft center of the rotor.

4 Claims, 12 Drawing Sheets

(52) U.S. Cl.
CPC ............. *Y02E 10/22* (2013.01); *Y02E 10/223* (2013.01); *Y02E 10/28* (2013.01)

(58) Field of Classification Search
USPC ................................................ 290/54; 415/7
See application file for complete search history.

(56) References Cited

U.S. PATENT DOCUMENTS

| | | | | |
|---|---|---|---|---|
| 4,383,797 | A * | 5/1983 | Lee | F03B 17/062 405/22 |
| 5,051,059 | A | 9/1991 | Rademacher | |
| 2004/0101397 | A1 * | 5/2004 | Godsall | F03B 7/00 415/3.1 |
| 2008/0231057 | A1 * | 9/2008 | Zeuner | F03B 17/065 290/54 |
| 2011/0272946 | A1 * | 11/2011 | Kumano | F03B 17/065 290/54 |
| 2012/0243987 | A1 * | 9/2012 | Kumano | F03B 17/067 415/229 |

FOREIGN PATENT DOCUMENTS

| | | | | |
|---|---|---|---|---|
| JP | 58-158378 | | 9/1983 | |
| JP | 2003-307173 | A | 10/2003 | |
| JP | 2003307173 | A * | 10/2003 | |
| JP | 2008-31879 | A | 2/2008 | |
| JP | 2009-228608 | A | 10/2009 | |
| JP | EP 2133557 | A2 * | 12/2009 | ............... F03B 7/00 |
| JP | 4659917 | B1 | 3/2011 | |
| JP | 2010-170678 | B | 1/2012 | |
| JP | 2012-2220 | A | 1/2012 | |
| WO | WO 2008115558 | A1 * | 9/2008 | ........... F03B 17/065 |

\* cited by examiner

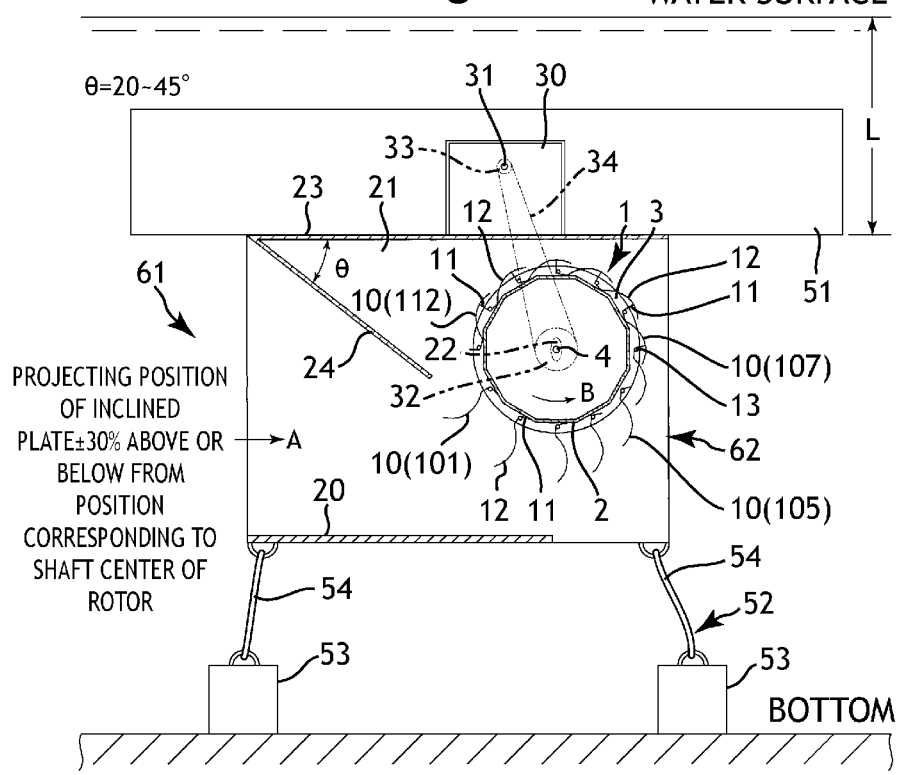
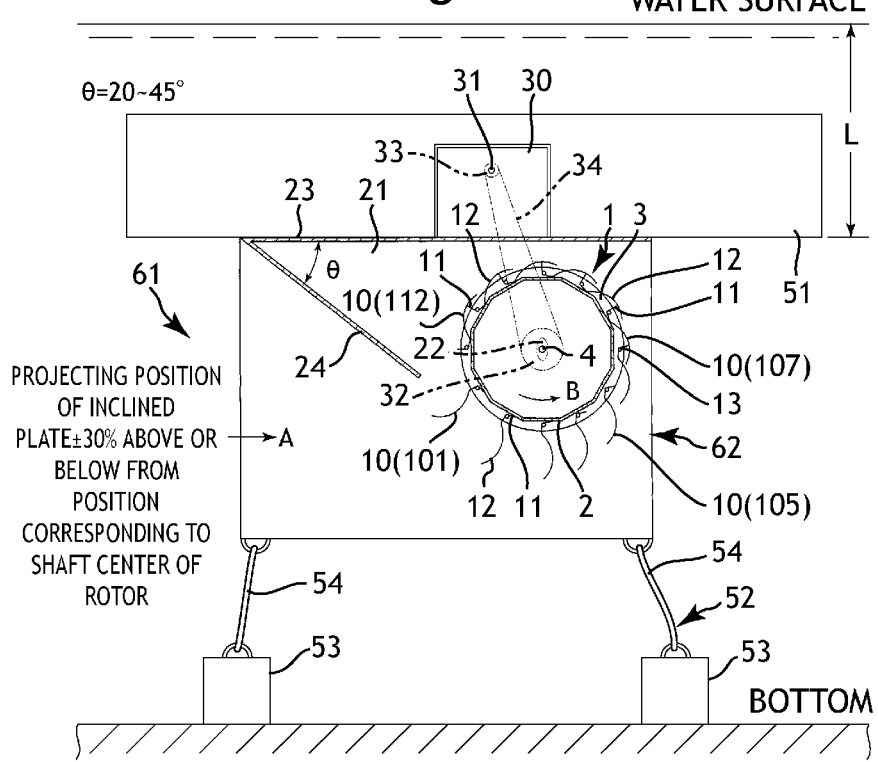

Fig. 8
(a) 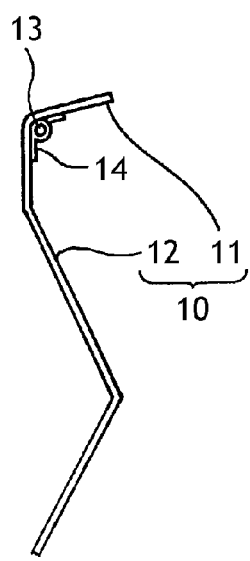
(b) 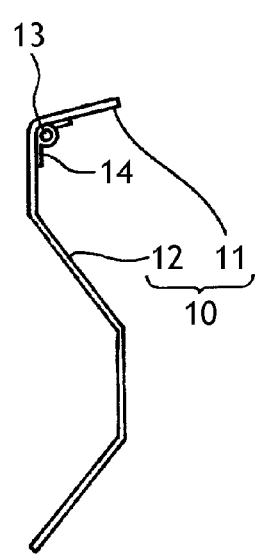
(c) 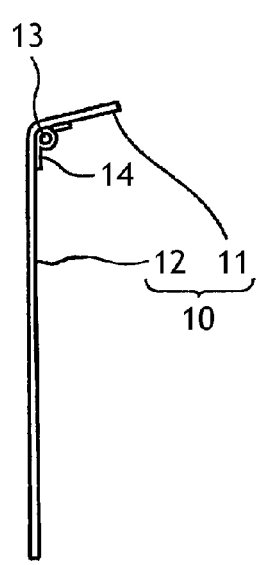

EXPERIMENT RESULTS

| INCLINED PLATE | INCLINATION(30°) | INCLINATION(30°) | INCLINATION(30°) |
|---|---|---|---|
| POSITION | SHAFT CENTER(50) | BELOW SHAFT | ABOVE SHAFT |
| BACK PLATE | NO | NO | NO |
| IMPELLER BLADE | MOVABLE(45°) | MOVABLE(45°) | MOVABLE(45°) |
| ACTUAL MEASUREMENT 1 | 35 | 42 | 32 |
| ACTUAL MEASUREMENT 2 | 39 | 39 | 35 |
| ACTUAL MEASUREMENT 3 | 32 | 36 | 36 |
| ACTUAL MEASUREMENT 4 | 33 | 39 | 36 |
| ACTUAL MEASUREMENT 5 | 35 | 33 | 34 |
| AVERAGE | 34.8 | 37.8 | 34.6 |

WATER WHEEL IMPELLER BLADE TYPE ELECTRIC POWER GENERATING APPARATUS

BACKGROUND OF THE INVENTION

Field of the Invention

The present invention relates to a water wheel impeller blade type electric power generating apparatus using a water stream of river water, seawater, or the like, to generate hydroelectric power, more specifically, to a water wheel impeller blade type electric power generating apparatus in which generated output of a power generator is improved by enhancing usage efficiency of a water stream of river water, seawater, or the like, and increasing the number of rotations of a rotor.

Description of the Related Art

The present inventor previously proposed a water wheel impeller blade type electric power generating apparatus using a water stream of river water, seawater, or the like, to generate hydroelectric power and has obtained a patent (Patent Document 1).

The water wheel impeller blade type electric power generating apparatus of Patent Document 1 includes an electric power generating apparatus body allowing inflow and outflow of a water stream, a rotor pivotally supported within the electric power generating apparatus body so as to be able to rotate, the rotor being disposed to be orthogonal to a direction of the water stream, an impeller blade group which includes a plurality of impeller blades provided on an outer periphery of the rotor and attached so as to be able to be automatically open at a lower side of the rotor and closed at an upper side of the rotor, the impeller blade group receiving force by the water stream flowing into the electric power generating apparatus body with open impeller blades to rotate the rotor, an inclined plate for guiding a water stream, having one end attached at an upper end of the electric power generating apparatus body at a water inflow side and a projecting tip approaching a vicinity of an impeller blade attached to the rotor, and a power generator generating electric power by transmission of rotating force generated by rotation of the rotor.

CITATION LIST

Patent Literature

Patent Document 1: Japanese Patent No. 4659917

The present invention has been made assuming a configuration of the water wheel impeller blade type electric power generating apparatus of the above-described Patent Document 1 and relates to a modified configuration thereof, and is directed to providing a water wheel impeller blade type electric power generating apparatus in which usage efficiency of a water stream is enhanced and the number of rotations of a rotor is increased, that is, generated output of a power generator can be improved through strict consideration of a position of an inclined plate for guiding the water stream, particularly, in the water wheel impeller blade type electric power generating apparatus floating by being pulled by a floating body, a length and a position of a bottom plate, an inclination angle of the inclined plate, arrangement of the inclined plate with respect to the rotor, or the like.

SUMMARY OF THE INVENTION

A water wheel impeller blade type electric power generating apparatus of the present invention includes a floating body, an electric power generating apparatus body attached to the floating body, the electric power generating apparatus body floating under water by buoyancy by the floating body and allowing inflow and outflow of a water stream, an anchorage unit anchoring the electric power generating apparatus body at a fixed position in the water stream, a rotor pivotally supported within the electric power generating apparatus body so as to be able to rotate, the rotor being disposed to be orthogonal to a direction of the water stream, an impeller blade group which includes a plurality of impeller blades attached on an outer periphery of the rotor so as to be automatically open at a lower side of the rotor and closed at an upper side of the rotor, the impeller blade group receiving force by the water stream flowing into the electric power generating apparatus body with open impeller blades to rotate the rotor, an inclined plate for guiding the water stream, having one end attached at an upper end of the electric power generating apparatus body at a water inflow side and a projecting tip approaching vicinity of an impeller blade attached to the rotor, and a power generator generating electric power by transmission of rotating force generated by rotation of the rotor, and the water wheel impeller blade type electric power generating apparatus has main features that an inclination angle of the inclined plate is set between 20° and 45°, and a position of the projecting tip of the inclined plate is set within a range of ±30% of a diameter of the rotor above or below from a position corresponding to a shaft center of the rotor.

Advantageous Effects of the Invention

According to an invention recited in claims 1 and 2, by employing a configuration where the inclination angle of the inclined plate is set between 20° and 45°, the position of the projecting tip of the inclined plate is set within a range of ±30% of the diameter of the rotor above or below from a position corresponding to a shaft center of the rotor, and, further, an end potion at the water inflow side of the inclined plate is formed in the shape of any of a triangular prism, a semicircular column, a substantially semicircular column and a flat plate, these elements are made appropriate for hydroelectric power generation, so that it is possible to realize and provide a water wheel impeller blade type electric power generating apparatus which can generate a large amount of electric power by efficiently utilizing force of a water stream.

According to an invention recited in claims 3 to 6, by employing a configuration substantially the same as that of the invention recited in claim 1 and in which a bottom plate is added, the inclination angle of the inclined plate is set between 20° and 45°, the position of the projecting tip of the inclined plate is set within a range of ±30% of the diameter of the rotor above or below from a position corresponding to a shaft center of the rotor, an end potion at the water inflow side of the inclined plate is formed in the shape of any of a triangular prism, a semicircular column, a substantially semicircular column and a flat plate, and the bottom plate includes a horizontal part at a base end side and a inclined part which is formed after the horizontal part ends short of a center of the rotor (configuration in FIG. 12) or which is formed by being made to project obliquely downward from the horizontal part at an inclination angle larger than the inclination angle of the inclined plate (configuration of FIG. 13), or the bottom plate includes a horizontal part at a base end side and a tip projecting part including a hanging part that extends downward from the horizontal part by a distance equal to or longer than a radius of the rotor and a tip horizontal part that projects in a horizontal direction, these elements are made appropriate for hydroelectric power generation, so that it is possible to realize and provide a water wheel impeller blade type electric power generating apparatus which can generate a large amount of electric power by efficiently utilizing force of a water stream.

BRIEF DESCRIPTION OF THE DRAWINGS

FIG. 1a is a cross-sectional view schematically showing a configuration of a water wheel impeller blade type electric power generating apparatus according to an embodiment of the present invention;

FIG. 1b is a cross-sectional view schematically showing the water wheel impeller blade type electric power generating apparatus according to the embodiment of the present invention, particularly, a cross-sectional view schematically showing the water wheel impeller blade type electric power generating apparatus in which an electric power generating apparatus body is configured without a base plate;

FIG. 5(a) is a lateral view, and FIG. 5(b) is a front view;

FIG. 8 is a perspective view showing three types of modifications of the impeller blade in the water wheel impeller blade type electric power generating apparatus according to the present embodiment;

DETAILED DESCRIPTION OF THE PREFERRED EMBODIMENTS

The present invention achieves an object of providing a water wheel impeller blade type electric power generating apparatus in which usage efficiency of a water stream is enhanced by making a position of an inclined plate for guiding a water stream in the water wheel impeller blade type electric power generating apparatus which floats by being pulled by a floating body, a length and a position of a bottom plate, an inclination angle of the inclined plate, arrangement of the inclined plate with respect to a rotor, or the like, appropriate, so that the number of rotations of the rotor can be increased, that is, generated output of a power generator can be improved, by configuring the water wheel impeller blade type electric power generating apparatus to include a floating body, an electric power generating apparatus body attached to the floating body, the electric power generating apparatus body floating under water by buoyance by the floating body and allowing inflow and outflow of the water stream, an anchorage unit anchoring the electric power generating apparatus body at a fixed position in the water stream, a rotor pivotally supported within the electric power generating apparatus body so as to be able to rotate, the rotor being disposed to be orthogonal to a direction of the water stream, an impeller blade group which includes a plurality of impeller blades attached on an outer periphery of the rotor so as to be automatically open at a lower side of the rotor and closed at an upper side of the rotor, the impeller blade group receiving force by the water stream flowing into the electric power generating apparatus body with open impeller blades to rotate the rotor, an inclined plate for guiding the water stream, having one end attached at an upper end of the electric power generating apparatus body at a water inflow side and a projecting tip approaching a vicinity of an impeller blade attached to the rotor, a bottom plate disposed in a flow channel below the inclined plate, and a power generator generating electric power by transmission of rotating force generated by rotation of the rotor, and by employing a configuration where an inclination angle of the inclined plate is set between 20° and 45°, a position of the projecting tip of the inclined plate is set within a range of ±30% of a diameter of the rotor above or below from a position corresponding to a shaft center of the rotor, the bottom plate is positioned below the shaft center of the rotor by ¾ to ⁶⁄₄ of the diameter of the rotor and provided to overlap with a portion where the inclined plate is provided, and an end potion at the water inflow side of the inclined plate is formed in the shape of a triangular prism, a semicircular column, a substantially semicircular column or a flat plate.

Embodiment

A water wheel impeller blade type electric power generating apparatus according to an embodiment of the present invention will be described in detail below with reference to the drawings.

Figure 2:
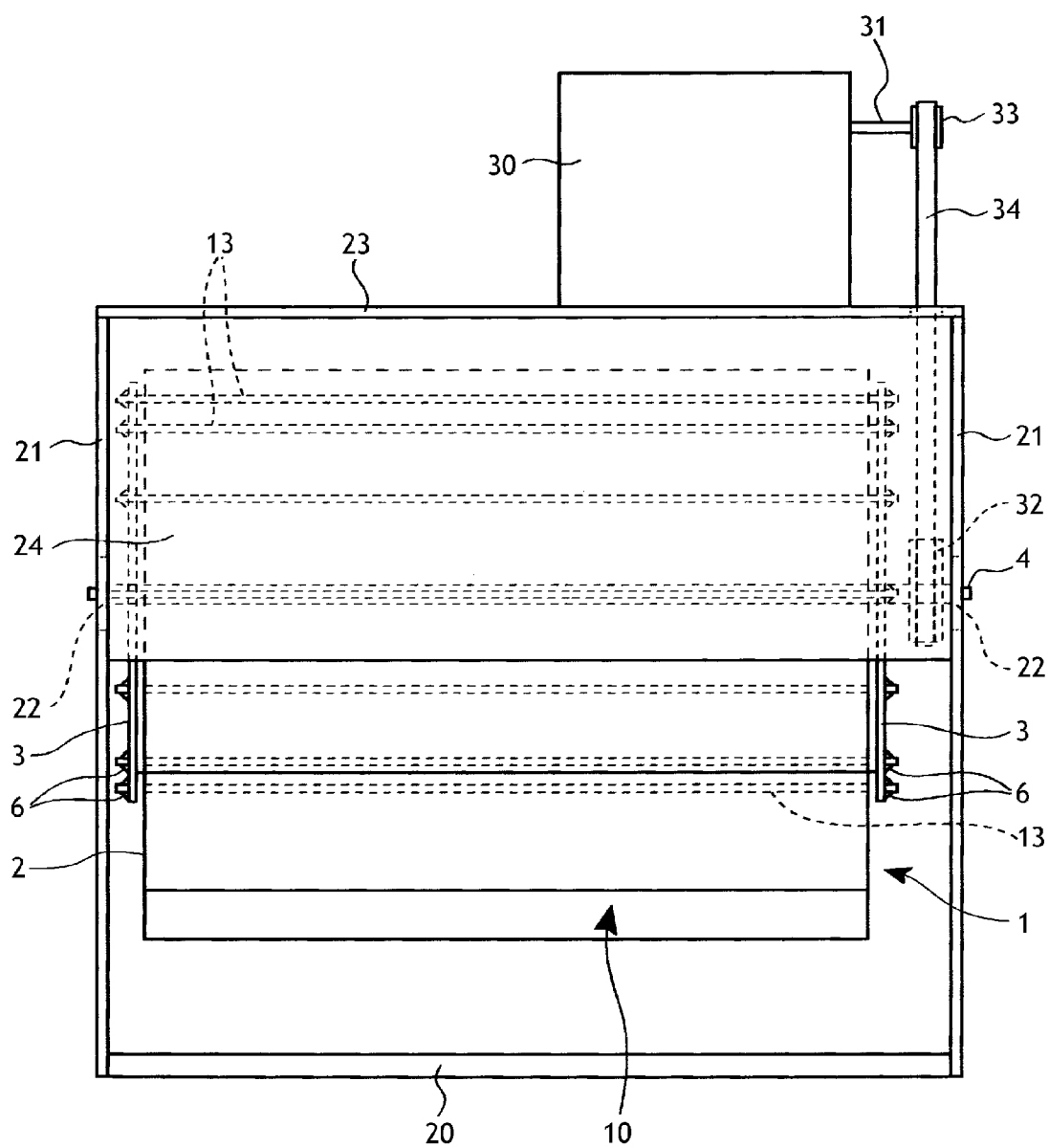
FIG. 2 is a lateral view schematically showing the configuration of the water wheel impeller blade type electric power generating apparatus according to the present embodiment.
Figure 3:
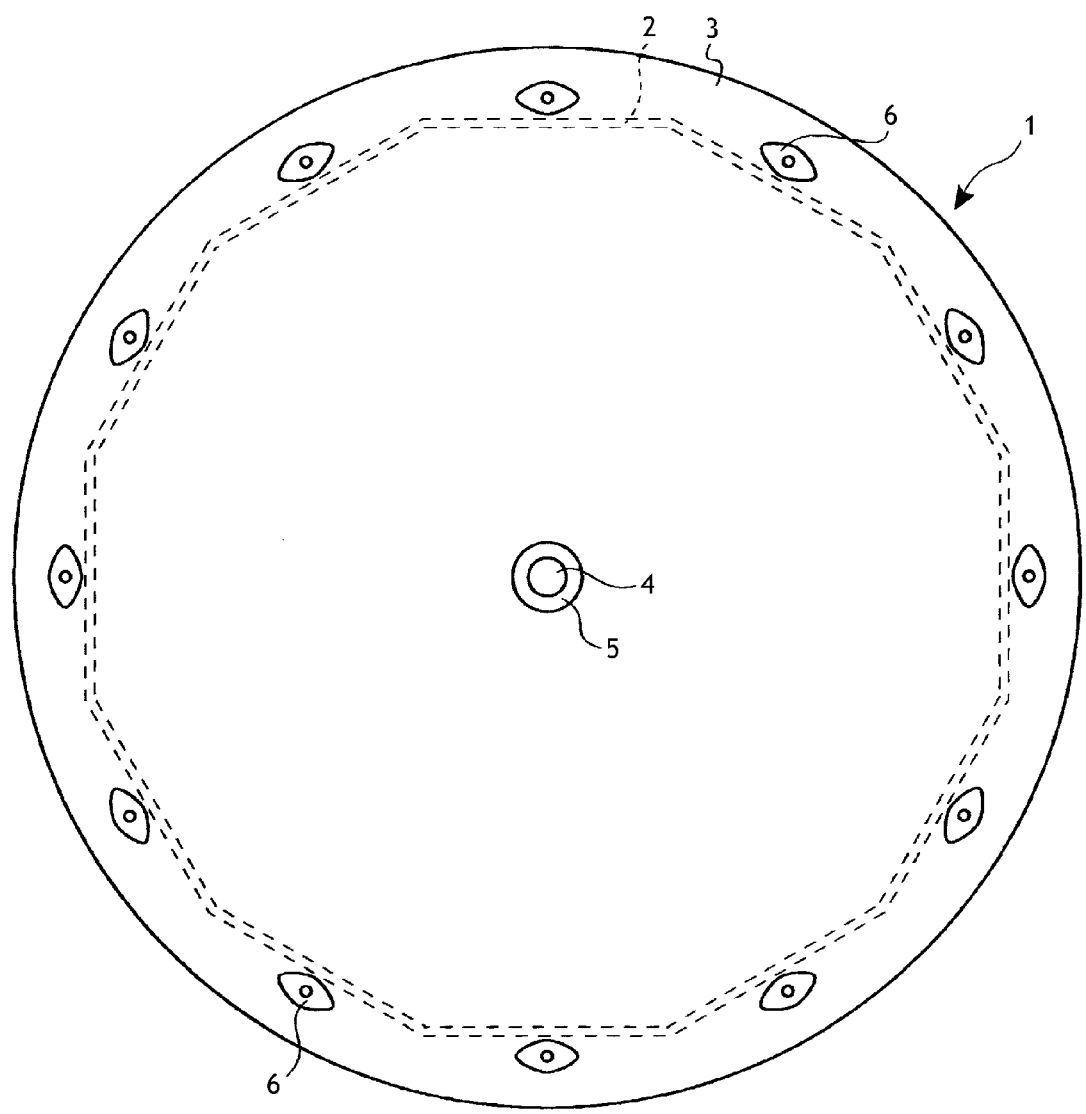
FIG. 3 is a lateral view of a rotor in the water wheel impeller blade type electric power generating apparatus according to the present embodiment.
Figure 4:
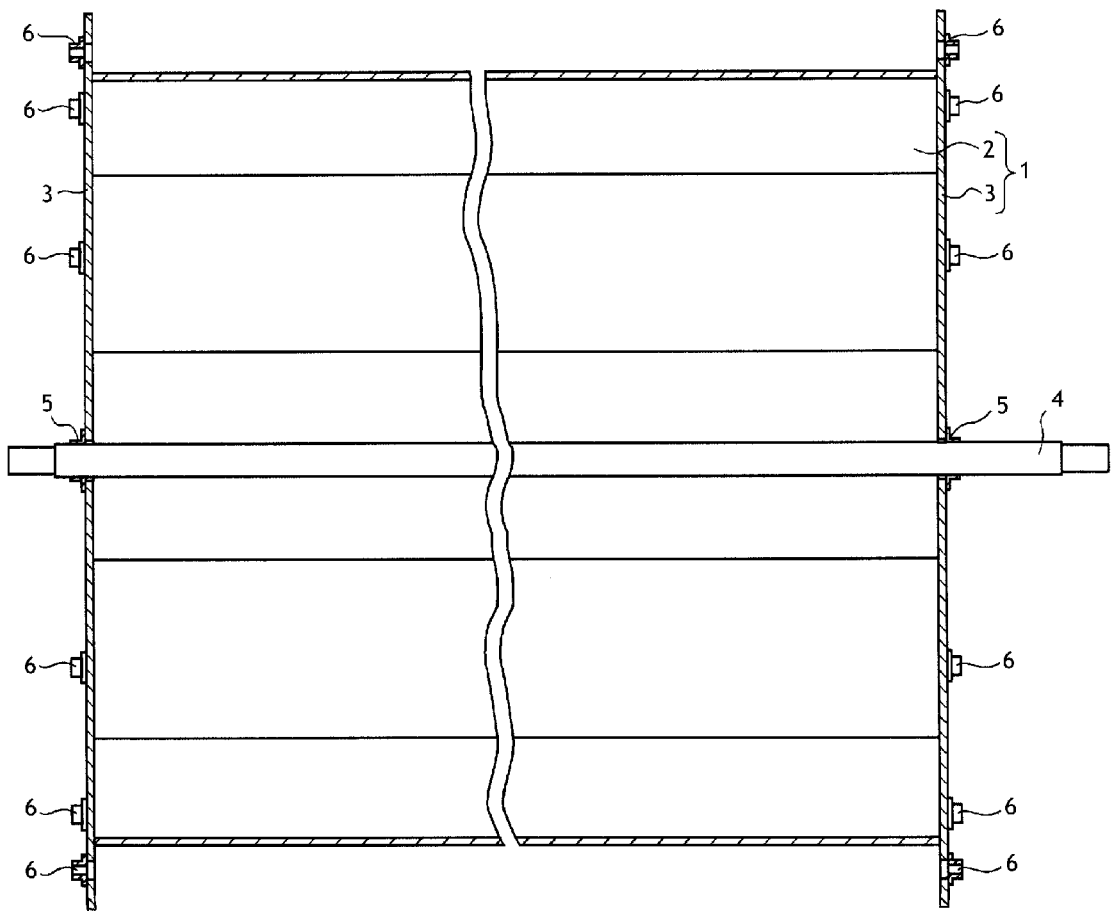
FIG. 4 is a cross-sectional view of the rotor in the water wheel impeller blade type electric power generating apparatus according to the present embodiment.

As shown in FIG. 1 and FIG. 2, a water wheel impeller blade type electric power generating apparatus 61 according to the present embodiment includes a floating body 51 disposed under water of seawater, river water, or the like, and generating buoyance, an electric power generating apparatus body 62 in a hollow cuboid shape, hanged and supported by the floating body 51, the electric power generating apparatus body 62 floating under water by the buoyance by the floating body 51 and allowing inflow and outflow of a water stream (a stream of seawater or a stream of river water), an anchorage unit anchoring the electric power generating apparatus body 62 at a fixed position in the water stream, a rotating shaft 4 transmitting through a chain 34 rotating force for generating electric power to a power generator 30 attached to the electric power generating apparatus body 62, a rotor 1 fixed at this rotating shaft 4, and an impeller blade group comprised of a plurality of impeller blades 10 provided on an outer periphery of the rotor 1 at predetermined intervals and receiving a flow of water to rotate the rotor 1.

The electric power generating apparatus body 62 is supported by the floating body 51 and disposed at a predetermined position in the sea, the river, or the like, while floating under water, and is configured to be anchored at the predetermined position and prevented from flowing away by using an anchoring unit 52 configured with a conic solid 53 with predetermined weight, placed at a bottom of the sea, the river, or the like, and a coupling member 54 formed with a rope, a chain, or the like, coupled to a bottom of the electric power generating apparatus body 62.

When the floating body 51 and the water wheel impeller blade type electric power generating apparatus 61 are provided in, for example, the seawater, sizes and weight of the floating body 51 and the water wheel impeller blade type electric power generating apparatus 61 are set so that a depth L from the water surface falls within a range, for example, between 10 m and 50 m taking into account stability of flow of the water stream.

As shown in FIG. 1 to FIG. 4, the rotor 1 is comprised of a drum body 2 having an outer periphery formed in the shape of a dodecahedron, and a side plate 3 fixed to each of both sides of this drum body 2, the outside diameter of the side plate 3 being larger than that of the drum body 2. The side plate 3 is fixed to a rotating shaft 4 by means of a fixing member 5. At a portion which is projected upward from the drum body 2 of the side plate 3, a bearing 6 is fixed in twelve places corresponding to the respective sides of the dodecahedron.

Figure 5:
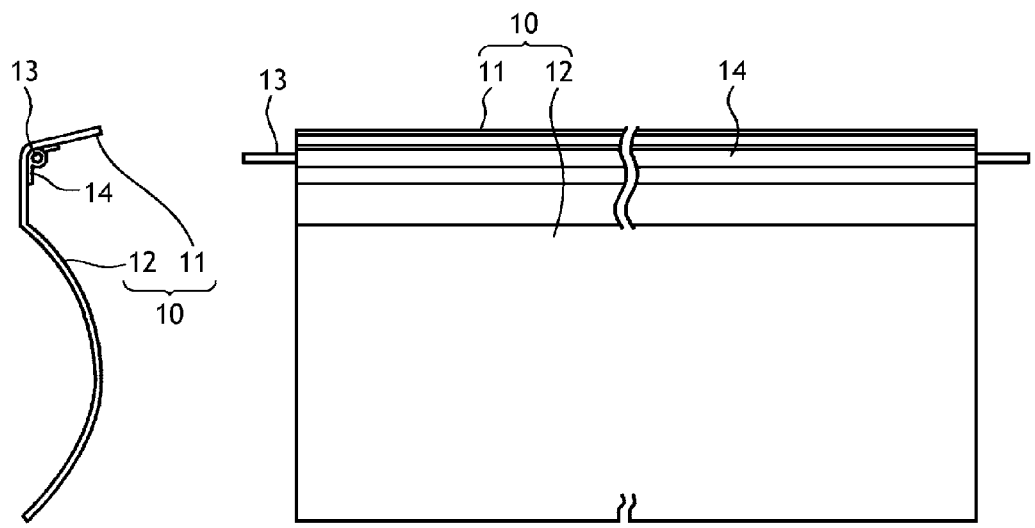
FIG. 5 shows an impeller blade in the water wheel impeller blade type electric power generating apparatus according to the present embodiment.

A plurality of impeller blades 10 shown in FIG. 5 are mounted to the rotor 1 to configure an impeller blade group.

Each of the impeller blades 10 is comprised of a stopper part 11 and a fluid receiving part 12 which extends from this stopper part 11, being longer than the stopper part 11, and is fixed to a support shaft 13 by means of a fixing member 14.

Both end parts of the support shaft 13 are rotatably supported by means of the bearings 6 which are disposed oppositely to each other.

The fluid receiving surface of the fluid receiving part 12 is concaved in the shape of a circular arc such that it can receive a larger volume of fluid when the fluid receiving part 12 is erected with the stopper part 11 being butted against the drum body 2 of the rotor 1.

As shown in FIG. 1, the fluid receiving part 12 is provided with a length large enough to cover the stopper part 11 and the lower portion of the fluid receiving part 12 of the impeller blade 10 given on the thrust down side when the impeller blade 10 is thrust down.

As shown in FIG. 1*a* and FIG. 2, the rotating shaft 4 of the rotor 1 to which the impeller blades 10 are mounted is rotatably supported by means of a side plate 21 which is fixed on both sides of a base plate 20 constituting the electric power generating apparatus body 62, through a bearing 22.

On both side plates 21, a top plate 23 is fixed. In other words, the base plate 20, the side plate 21 and the top plate 23 constitute a frame body of the electric power generating apparatus body 62. It should be noted that as shown in FIG. 1*b*, it is also possible to constitute the electric power generating apparatus body 62 with each side plate 21 fixed at the both sides of the top plate 23 without the base plate 20 constituting the electric power generating apparatus body 62, in which case the coupling member 54 is coupled to a portion of the side plate 21 by means of the anchorage unit 52.

To the front end part of the top plate 23, an inclined plate 24 positioned to be inclined inward and obliquely downward (at an inclination angle θ) is provided.

Herein, the inclined plate 24 fulfills a flow direction changing function for guiding a water stream flowing in the direction A to the impeller blades 10 positioned under the rotating shaft 4.

Above the top plate 23, a power generator 30 is provided such that an input shaft 31 of the power generator 30 is in parallel with the rotating shaft 4.

To one end part of the rotating shaft 4 and one end part of the input shaft 31, gears 32, 33 are fixed, respectively, and the gears 32, 33 are connected by a chain 34 so that rotating force of the rotating shaft 4 is transmitted to the input shaft 31 of the power generator 30 through the chain 34.

According to the water wheel impeller blade type electric power generating apparatus 61 according to the present embodiment, by disposing the electric power generating apparatus body 62 under water so that the inclined plate 24 faces the flowing direction A of the water, the water stream flowing toward the inclined plate 24 is butted against the fluid receiving part 12 of the impeller blades 10 (101 to 105) positioned under the rotating shaft 4, resulting in the rotor 1 and the rotating shaft 4 being rotated in the direction of arrow B.

The rotating force of the rotating shaft 4 is transmitted to the input shaft 31 of the power generator 30 through the gears 32, 33 and the chain 34, and, thus, the power generator 30 can generate electric power according to the rotation of the rotor 1.

In the water wheel impeller blade electric power generating apparatus 61 according to the present embodiment, the fluid receiving part 12 of the impeller blades 10 is longer and heavier than the stopper part 11, thus the impeller blades 10 (107 to 112) positioned above the rotating shaft 4 are naturally thrust down by their own weight.

In other words, when the impeller blade 10 is thrust down, the fluid receiving area for the impeller blade 10 is substantially reduced, whereby, on the backward motion side, the resistance of the impeller blade 10 to the fluid is reduced.

In addition, when the impeller blade 10 is thrust down, the fluid receiving part 12 covers the stopper part 11 and the lower portion of the fluid receiving part 12 of the subsequent impeller blade 10, being butted against the stopper part 11 thereof. This also reduces the resistance of the impeller blade 10 to the fluid on the backward motion side.

In addition to the above-mentioned advantageous effects, the water wheel impeller blade type electric power generating apparatus 61 according to the present embodiment exerts the following ones.

The inclined plate 24 will cause the water to flow under the rotor 1, whereby the mud, sand, dirt, and the like, in the water stream will not be collected into the rotor 1, the impeller blades 10, and the like.

In addition, the rotor 1 is constituted by components having simple geometries, and further, the stopper part 11 and the fluid receiving part 12 can be manufactured as an integral part, thus the apparatus allows a substantial reduction in manufacturing cost.

Figure 6:
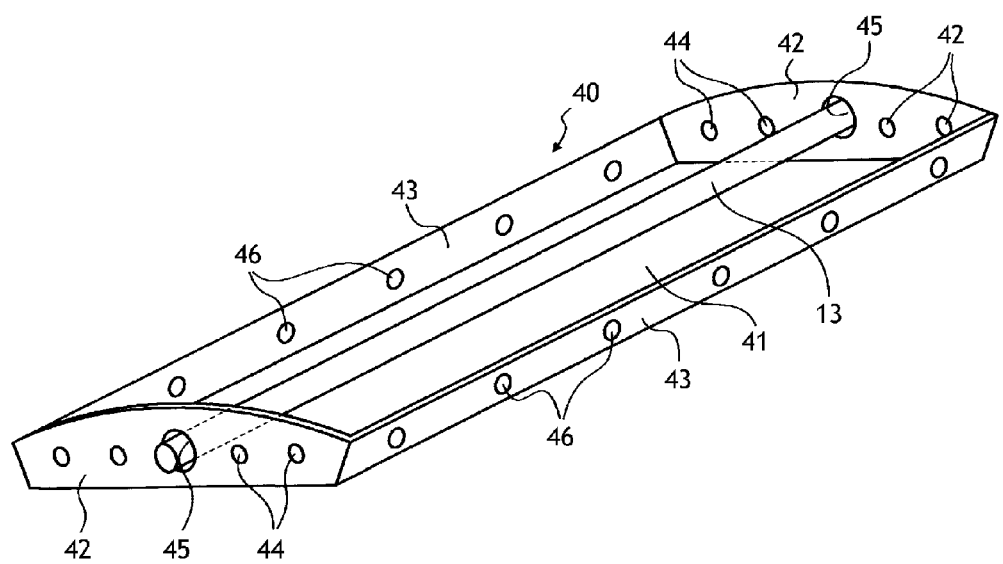
FIG. 6 is a perspective view of a tray configuring a drum body in the water wheel impeller blade type electric power generating apparatus according to the present embodiment.
Figure 7:
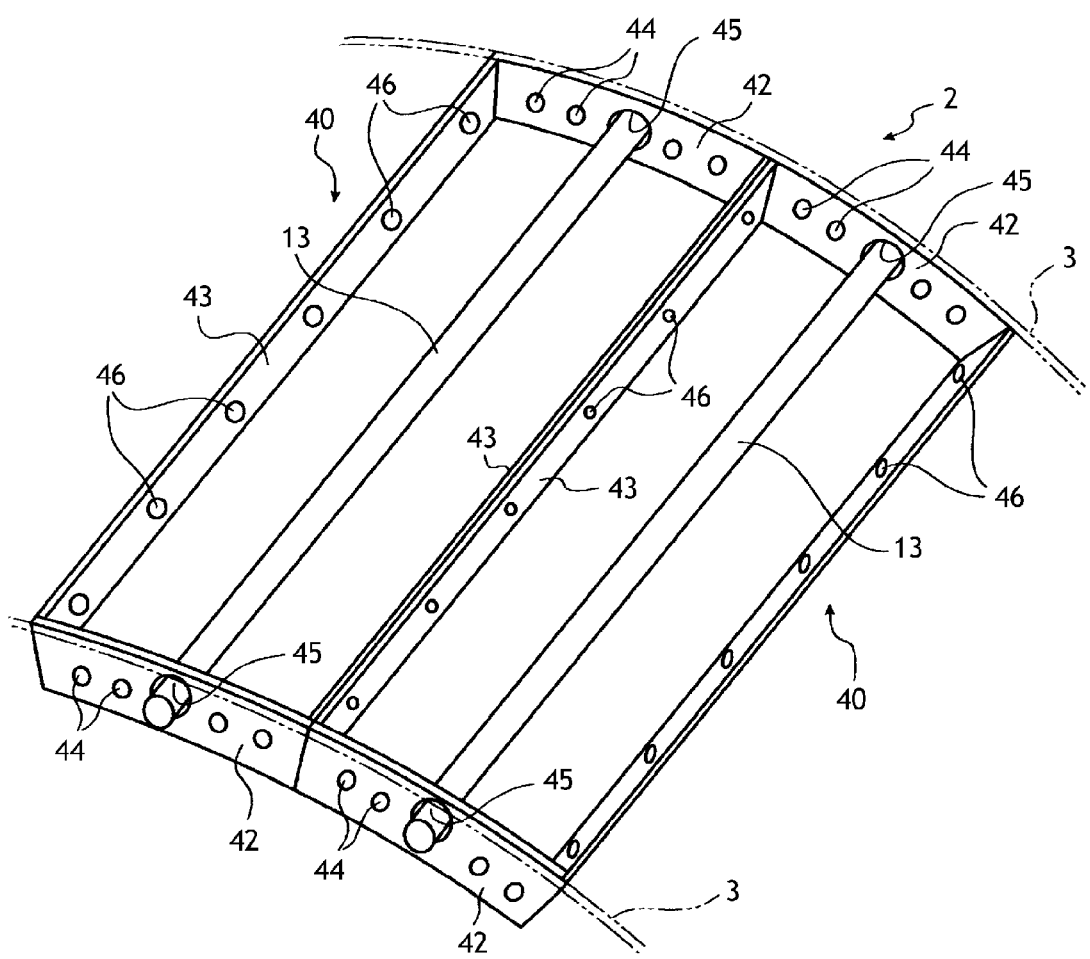
FIG. 7 is a partial perspective view showing a state where the drum body is assembled in the water wheel impeller blade type electric power generating apparatus according to the present embodiment.

FIG. 6 and FIG. 7 show part of manufacturing process of the drum body 2, and show an example where the drum body 2 is constituted with twelve trays 40.

The tray 40 is comprised of side plate fixing parts 42 which are produced by folding, at right angles, the edge portions on the shorter side of a tray bottom plate 41 in the shape of a rectangle such that they can be fixed to the side plates 3, and tray fixing parts 43 which are produced by folding the edge portions on the longer side of the tray bottom plate 41 at an angle with an inclination toward the outside such that they can be fixed to the respective adjacent trays 40.

In the side plate fixing part 42, a plurality of bolt insertion holes 44 for fixing it to the side plate 3 with bolts and nuts, and a support shaft insertion hole 45 for inserting the support shaft 13 are formed.

Also in the tray fixing part 43, a plurality of bolt insertion holes 46 for fixing the adjacent trays 40 to one another with bolts and nuts are formed.

Although it is not shown, in the side plate 3, bolt insertion holes corresponding to the bolt insertion holes 44 are formed. In addition, the bearing 6 which is fixed to the side plate 3 is formed such that it can accommodate the support shaft insertion hole 45 when the tray 40 is fixed to the side plate 3.

Next, how to assemble the drum body 2 will be described. The bolt insertion hole 44 in the side plate fixing part 42 of the tray 40 is aligned to a bolt insertion hole in the side plate 3, and a bolt is inserted into the bolt insertion hole 44 in the side plate fixing part 42 and a bolt insertion hole in the side plate 3 to be fixed with a nut.

In this way, the twelve trays 40 are fixed to the side plates 3. Thereafter, a bolt is inserted into the respective bolt insertion holes 46 in the respective adjacent trays 40 to be fixed with a nut.

Thereby, the twelve trays 40 are fixed to the side plates 3, and the respective adjacent trays 40 are fixed to one another to constitute a rotor 1.

Thereafter, the support shaft 13 is inserted into the support shaft insertion hole 45 in the tray 40, and the bearing 6 is mounted to each end of the support shaft 13 and is fixed to the side plate 3.

Then, as shown in FIG. 5, the impeller blade 10 is fixed to the support shaft 13 by means of the fixing member 14.

Thus, the drum body 2 is constituted by the twelve trays 40 which each accommodate the support shaft 13 to which the impeller blade 10 is mounted, and in the tray 40, the side plate fixing parts 42 to be fixed to the side plate 3 and the tray fixing parts 43 to be fixed to the adjacent tray 40 are formed.

In other words, with the tray 40, the side plate fixing parts 42 are fixed to the side plates 3, and the adjacent tray fixing parts 43 are fixed to each other, whereby the tray 40 has an increased strength, and can sufficiently withstand the hydraulic pressure. In addition, the side plate fixing parts 42 and the tray fixing parts 43 are produced by folding the edge portions of a plate, whereby the tray 40 can be manufactured inexpensively with no need for making a complicated machining operation.

Further, the tray 40 and the side plate 3, and the adjacent trays 40 are fixed to each other by using bolts and nuts. In other words, any stainless steel materials, if welded, will be deteriorated having red rust due to the composition change, but the present trays made of stainless steel are fixed by using bolts and nuts rather than by welding, thus they will be free from oxidation deterioration.

FIG. 8 shows three types of modifications of the impeller blade 10. With the impeller blade 10 (see FIG. 5) described above, the fluid receiving surface of the fluid receiving part 12 is concaved in the shape of a circular arc.

In FIG. 8(a), the fluid receiving surface is concaved in the shape of a letter V, while, in FIG. 8(b), the fluid receiving surface is concaved in the shape of a trapezoid. Even with such geometries, the impeller blades 10 shown in FIG. 8(a) and FIG. 8(b) are preferable because they can receive as large a volume of fluid as the impeller blade shown in FIG. 5.

In FIG. 8(c), the fluid receiving surface of the fluid receiving part 12 is adapted to be in the shape of a flat plane. In this case, the same advantageous effects as those with the impeller blades shown in FIG. 5, FIG. 7(a), and FIG. 7(b) will not be exerted, but the other advantageous effects with the present apparatus will be assured.

In the above-described embodiment, on the assumption that the drum body 2 has twelve faces, twelve impeller blades 10 are provided, however, the number of impeller blades 10 is not specifically defined. In addition, the drum body 2 may be formed in the shape of a circle rather than a square.

Next, one example of a water tank experiment conducted in association with the water wheel impeller blade type electric power generating apparatus 61 according to the present embodiment will be described.

Figure 9:
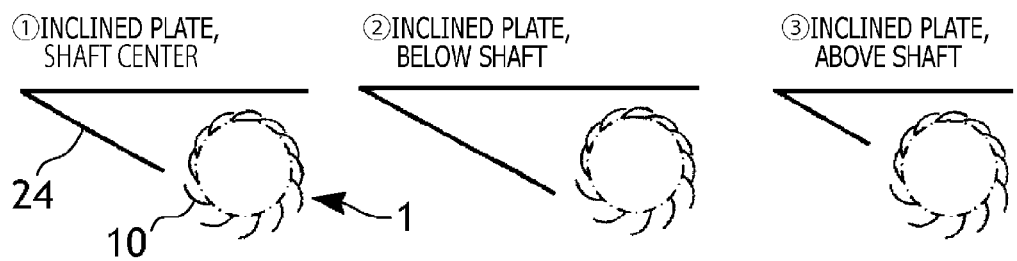
FIG. 9 is a diagram showing a schematic configuration of a model and results of experiments in examples of experiments relating to the present embodiment.

FIG. 9 shows results of the experiments conducted five times and shows average values of the number of rotations (rpm) per minute of the rotor 1 of each experiment, in a total of three aspects including an aspect where the position of the projecting tip of the inclined plate 24 at the rotor 1 side is set at a shaft center, an aspect where the position of the projecting tip of the inclined plate 24 at the rotor 1 side is set below the shaft center, and an aspect where the position of the projecting tip of the inclined plate 24 at the rotor 1 side is set above the shaft center (within a range of ±14 mm from the shaft center), in a case where the inclined plate 24 is inclined at a fixed inclination angle)($\theta=30°$) and the impeller blades 10 are made movable within a range of 30° with respect to the rotor 1. A flow rate of the water is set approximately 0.2 m/s.

As is clear from FIG. 9, the most favorable result (37.8 (rpm)) can be obtained when the impeller blades 10 is movable, and the position of the projecting tip of the inclined plate 24 at the rotor 1 side is set below the shaft center.

Further, results close to those in the above-described case can be also obtained when the position of the projecting tip of the inclined plate 24 at the rotor 1 side is set at the shaft center of the rotor 1, and when the position of the projecting tip of the inclined plate 24 at the rotor 1 side is set above the shaft center.

While the size of each element such as the rotor 1, the impeller blade 10, the top plate 23 and the inclined plate 24 in the water wheel impeller blade type electric power generating apparatus 61 of the present embodiment is naturally different from the size of each element corresponding to each of the elements according to each example experiment, the same reference numerals are assigned to the corresponding elements for convenience of explanation.

In the water wheel impeller blade type electric power generating apparatus 61 of the present embodiment, based on the above-described results of the experiments, the inclination angle $\theta$ of the inclined plate 24 is set between 20° and 45°, the position of the projecting tip of the inclined plate 24 is set within a range of ±30% of the diameter of the rotor 1 above or below from the position corresponding to the shaft center of the rotor 1.

Figure 10:
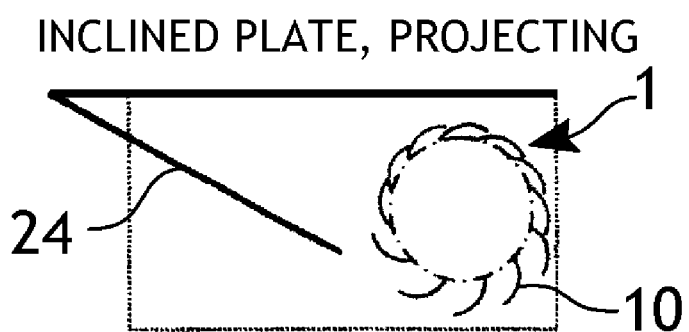
FIG. 10 is a schematic explanatory diagram showing an example where a water stream inflow side of an inclined plate in the water wheel impeller blade type electric power generating apparatus according to the present embodiment is formed in a triangular projecting shape.
Figure 11:
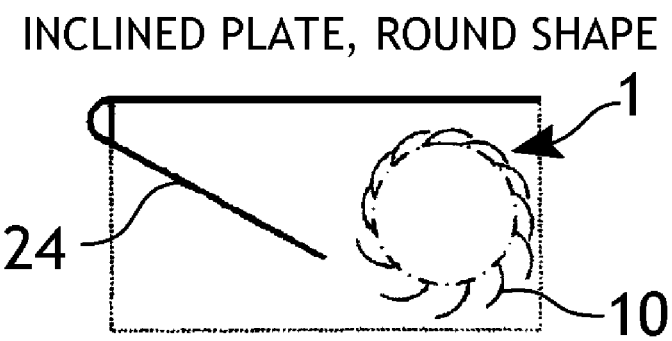
FIG. 11 is a schematic explanatory diagram showing an example where the water stream inflow side of the inclined plate in the water wheel impeller blade type electric power generating apparatus according to the present embodiment is formed in a round shape (semicircular column shape)

Further, in the water wheel impeller blade type electric power generating apparatus 61 of the present embodiment, the inclined plate 24 at the water stream inflow side is formed in a triangular projecting shape as shown in FIG. 10, or the inclined plate 24 at the water stream inflow side is formed in a round shape (semicircular column shape) as shown in FIG. 11.

Still further, although not shown, the inclined plate 24 at the water stream inflow side can be formed in the shape of a substantially semicircular column or a flat plate.

By setting the inclination angle θ of the inclined plate 24 in the water wheel impeller blade type electric power generating apparatus 61 of the present embodiment, the position of the projecting tip of the inclined plate 24, the shape of the inclined plate 24 at the water stream inflow side as described above, these elements can be made appropriate for hydroelectric power generation, so that it is possible to realize and provide a water wheel impeller blade type electric power generating apparatus 61 which can generate a large amount of electric power by efficiently utilizing force of the water stream.

Figure 12:
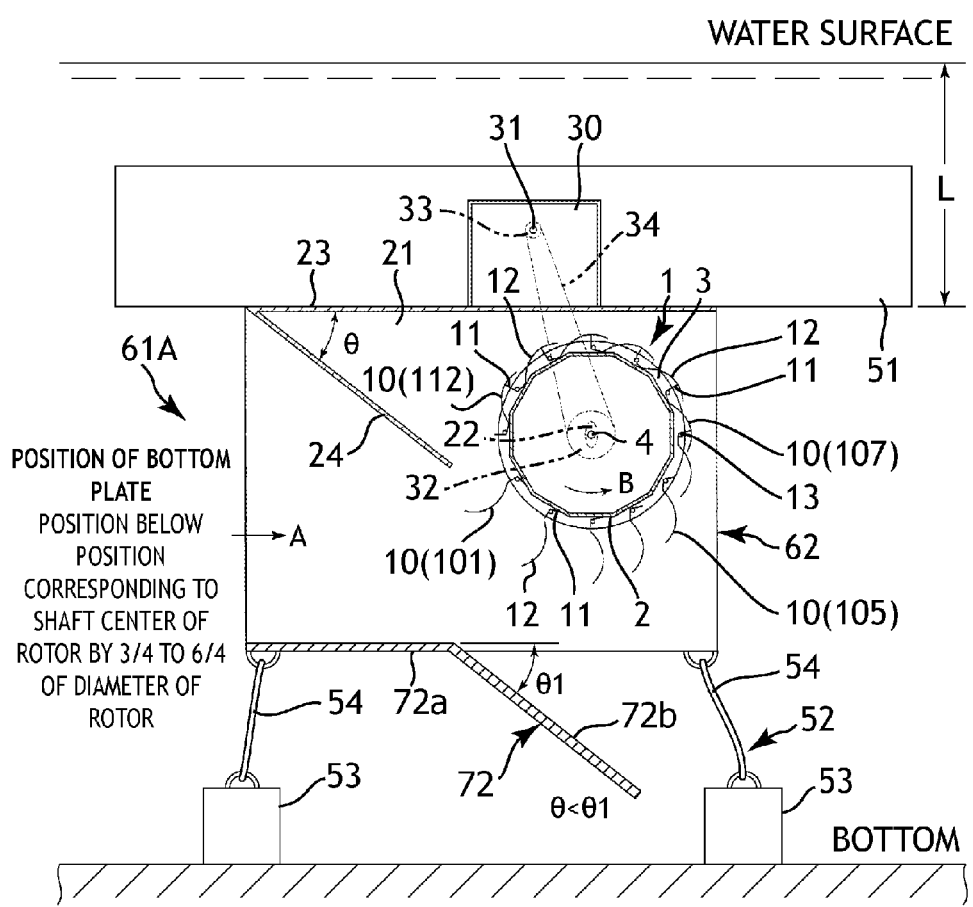
FIG. 12 is a cross-sectional view schematically showing a configuration of a water wheel impeller blade type electric power generating apparatus according to a modification of the embodiment of the present invention.
Figure 13:
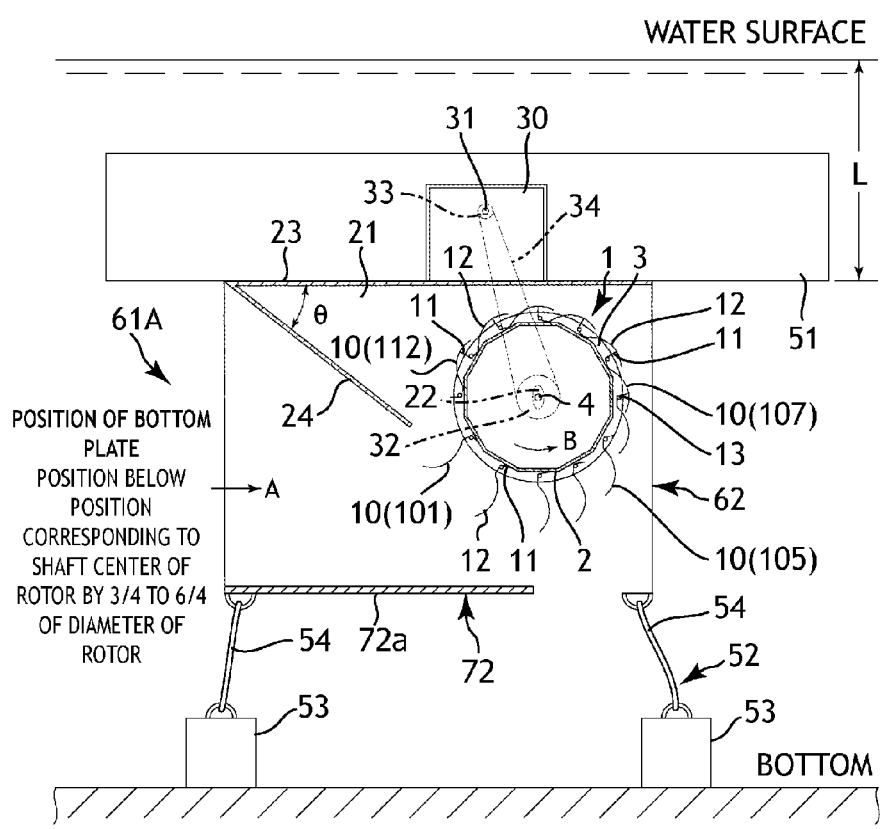
FIG. 13 is a cross-sectional view schematically showing a configuration of a water wheel impeller blade type electric power generating apparatus according to another modification of the embodiment of the present invention.

FIG. 12 shows a water wheel impeller blade type electric power generating apparatus 61A according to a modification, which has the same basic configuration as that of the water wheel impeller blade type electric power generating apparatus 61 of the embodiment, except that a bottom plate 72 is provided below the inclined plate 24. Further, FIG. 13 shows a water wheel impeller blade type electric power generating apparatus 61A according to another modification which is different from that shown in FIG. 12.

In other words, in the water wheel impeller blade type electric power generating apparatus 61A according to the modification, the bottom plate 72 is positioned below the shaft center of the rotor 1 by ¾ to ⁶⁄₄ of the diameter of the rotor 1, and disposed to vertically overlap with a portion where the inclined plate 24 is provided.

The bottom plate 72 is configured to include a horizontal part 72a at the base end side, and an inclined part 72b that projects obliquely downward from the horizontal part 72a at an inclination angle θ1 (θ<θ1) larger than the inclination angle θ of the inclined plate 24.

Further, also in the water wheel impeller blade type electric power generating apparatus 61A according to the modification, the shape of the inclined plate 24 at the water stream inflow side can be configured in a similar manner to that of the above-described embodiment.

With the inclination angle θ of the inclined plate 24 in the water wheel impeller blade type electric power generating apparatus 61A according to the modification shown in FIG. 12, the position of the projecting tip of the inclined plate 24, the shape of the inclined plate 24 at the water inflow side and the arrangement and the shape of the bottom plate 72, these elements can be made appropriate for hydroelectric power generation, so that it is possible to realize and provide a water wheel impeller blade type electric power generating apparatus 61A which can generate a large amount of electric power by efficiently utilizing force of the water stream.

Figure 14:
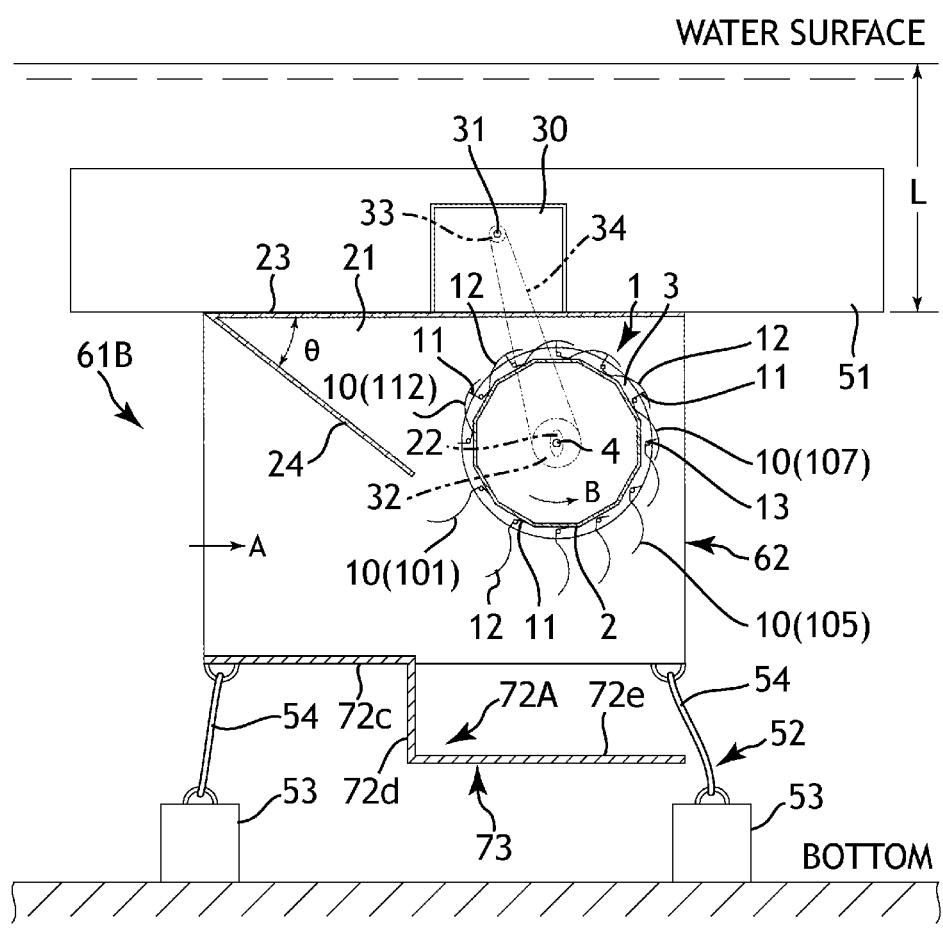
FIG. 14 is a cross-sectional view schematically showing a configuration of a water wheel impeller blade type electric power generating apparatus according to still another modification of the embodiment of the present invention.

FIG. 14 shows a water wheel impeller blade type electric power generating apparatus 61B according to still another modification, which has the same basic configuration as that of the water wheel impeller blade type electric power generating apparatus 61 of the above-described embodiment, except that a bottom plate 72A is provided below the inclined plate 24 and the bottom plate 72A is formed in a different shape from that of the bottom plate 72 shown in FIG. 12.

In the water wheel impeller blade type electric power generating apparatus 61B according to still another modification, the bottom plate 72A is positioned below the shaft center of the rotor 1 by ¾ to ⁶⁄₄ of the diameter of the rotor 1, and provided to vertically overlap with a portion where the inclined plate 72 is provided.

Further, the bottom plate 72A is configured to include a horizontal part 72c at the base end side, and a tip projecting part 73 including a hanging part 72d that extends downward from the horizontal part 72c by a distance equal to or longer than the radius of the rotor 1 and a tip horizontal part 72e that projects in a horizontal direction.

With the inclination angle θ of the inclined plate 24 in the water wheel impeller blade type electric power generating apparatus 61B according to still another modification shown in FIG. 14, the position of the projecting tip of the inclined plate 24, the shape of the inclined plate 24 at the water stream inflow side, and the arrangement and the shape of the bottom plate 72A, these elements can be made appropriate for hydroelectric power generation, so that it is possible to realize and provide a water wheel impeller blade type electric power generating apparatus 61B which can generate a large amount of electric power by efficiently utilizing force of the water stream.

INDUSTRIAL APPLICABILITY

The water wheel impeller blade type electric power generating apparatus of the present invention can be widely applied as a relatively small-scale hydroelectric power generating apparatus in a river where a water stream is generated, in the sea where force of flowing seawater can be expected, or the like.

DESCRIPTION OF SYMBOLS

1 Rotor
2 Drum body
3 Side plate
4 Rotating shaft
5 Fixing member
6 Bearing
10 Impeller blade
11 Stopper part
12 Fluid receiving part
13 Support shaft
14 Fixing member
20 Base plate
21 Side plate
22 Bearing
23 Top plate
24 Inclined plate
30 Power generator
31 Input shaft
32 Gear
33 Gear
34 Chain
40 Tray
41 Tray bottom plate
42 Side plate fixing part
43 Tray fixing part
44 Bolt insertion hole
45 Support shaft insertion hole
46 Bolt insertion hole 51 Floating body
52 Anchorage unit
53 Conic solid
54 Coupling member
61 Water wheel impeller blade type electric power generating apparatus
61A Water wheel impeller blade type electric power generating apparatus
61B Water wheel impeller blade type electric power generating apparatus
62 Electric power generating apparatus body
72 Bottom plate
72A Bottom plate
72a Horizontal part
72b Inclined part
72c Horizontal part
72d Hanging part
72e Tip horizontal part
73 Tip projecting part

What is claimed is:

1. A water wheel impeller blade type electric power generating apparatus comprising:
    a floating body;
    an electric power generating apparatus body attached to the floating body, the electric power generating apparatus body floating under water by buoyance by the floating body and allowing inflow and outflow of a water stream;
    an anchorage unit anchoring the electric power generating apparatus body at a fixed position in the water stream;
    a rotor pivotally supported within the electric power generating apparatus body so as to be able to rotate, the rotor being disposed so as to be orthogonal to a direction of the water stream;
    an impeller blade group including a plurality of impeller blades attached on an outer periphery of the rotor so as to be automatically open at a lower side of the rotor and closed at an upper side of the rotor, the impeller blade group receiving force of the water stream flowing into the electric power generating apparatus body with open impeller blades to rotate the rotor;
    an inclined plate for guiding the water stream, having one end attached at an upper end of the electric power generating apparatus body at a water inflow side and a projecting tip approaching a vicinity of an impeller blade attached to the rotor;
    a bottom plate disposed in a flow channel below the inclined plate; and
    a power generator generating electric power by transmission of rotating force generated by rotation of the rotor,
    wherein an inclination angle of the inclined plate is set between 20° and 45°, a position of the projecting tip of the inclined plate is set within a range of ±30% of a diameter of the rotor above or below from a position corresponding to a shaft center of the rotor, and the bottom plate is positioned below a shaft center of the rotor by ¾ to 5/4 of the diameter of the rotor and provided to overlap with a portion where the inclined plate is provided; and
    wherein a bottom plate comprises a shape selected from the group consisting of:
    a horizontal part at a base end side, and an inclined part which is formed after the horizontal part ends short of a center of the rotor, and
    a horizontal part at a base end side and an inclined part which is formed by being made to project obliquely downward from the horizontal part at an inclination angle larger than the inclination angle of the inclined plate.

2. The water wheel impeller blade type electric power generating apparatus according to claim 1, wherein an end part of the inclined plate at a water inflow side is formed in a shape selected from the group consisting of: a triangular prism, a semicircular column, a substantially semicircular column, and a flat plate.

3. A water wheel impeller blade type electric power generating apparatus comprising:
    a floating body;
    an electric power generating apparatus body attached to the floating body, the electric power generating apparatus body floating under water by buoyance by the floating body and allowing inflow and outflow of a water stream;
    an anchorage unit anchoring the electric power generating apparatus body at a fixed position in the water stream;
    a rotor pivotally supported within the electric power generating apparatus body so as to be able to rotate, the rotor being disposed so as to be orthogonal to a direction of the water stream;
    an impeller blade group including a plurality of impeller blades attached on an outer periphery of the rotor so as to be automatically open at a lower side of the rotor and closed at an upper side of the rotor, the impeller blade group receiving force of the water stream flowing into the electric power generating apparatus body with open impeller blades to rotate the rotor;
    an inclined plate for guiding the water stream, having one end attached at an upper end of the electric power generating apparatus body at a water inflow side and a projecting tip approaching a vicinity of an impeller blade attached to the rotor;
    a bottom plate disposed in a flow channel below the inclined plate; and
    a power generator generating electric power by transmission of rotating force generated by rotation of the rotor,
    wherein an inclination angle of the inclined plate is set between 20° and 45°, a position of the projecting tip of the inclined plate is set within a range of ±30% of a diameter of the rotor above or below from a position corresponding to a shaft center of the rotor, and the bottom plate is positioned below a shaft center of the rotor by ¾ to 5/4 of the diameter of the rotor and provided to overlap with a portion where the inclined plate is provided; and
    wherein a bottom plate comprises a shape selected from the group consisting of:
    a horizontal part at a base end side, and an inclined part which is formed after the horizontal part ends short of a center of the rotor, and
    a bottom plate comprises a horizontal part at a base end side, and a tip projecting part including a hanging part that extends downward from the horizontal part by a distance equal to or longer than a radius of the rotor and a tip horizontal part that projects in a horizontal direction.

4. The water wheel impeller blade type electric power generating apparatus according to claim 3, wherein an end part of the inclined plate at a water inflow side is formed in a shape selected from the group consisting of: a triangular prism, a semicircular column, a substantially semicircular column, and a flat plate.

* * * * *